(12) United States Patent
Lee et al.

(10) Patent No.: US 7,849,882 B1
(45) Date of Patent: Dec. 14, 2010

(54) DOUBLE PLUG HEAD FOR PLUGGING PIPE

(75) Inventors: Woo Kag Lee, Seoul (KR); Min Ho Song, Incheon (KR)

(73) Assignee: Donghwa Industry Co. Ltd (KR)

( * ) Notice: Subject to any disclaimer, the term of this patent is extended or adjusted under 35 U.S.C. 154(b) by 0 days.

(21) Appl. No.: 12/776,735

(22) Filed: May 10, 2010

(30) Foreign Application Priority Data

Mar. 12, 2010 (KR) ...................... 10-2010-0022530

(51) Int. Cl.
*F16L 55/10* (2006.01)
(52) U.S. Cl. .............................. 138/94; 138/93; 138/89; 138/90; 138/91
(58) Field of Classification Search ............. 138/89–95; 137/312
See application file for complete search history.

(56) References Cited

U.S. PATENT DOCUMENTS

| 2,906,295 | A | * | 9/1959 | Ver Nooy | 138/94 |
|---|---|---|---|---|---|
| 3,025,885 | A | * | 3/1962 | Ver Nooy | 138/94 |
| 3,626,475 | A | * | 12/1971 | Hicks | 138/94 |
| 3,774,647 | A | * | 11/1973 | Saha et al. | 138/94 |
| 4,202,377 | A | * | 5/1980 | Harrison | 138/94 |
| 5,082,026 | A | * | 1/1992 | Smith | 138/94 |
| 2009/0114301 | A1 | * | 5/2009 | Yeazel et al. | 138/90 |
| 2009/0114302 | A1 | * | 5/2009 | Yeazel et al. | 138/90 |

* cited by examiner

*Primary Examiner*—Patrick F Brinson
(74) *Attorney, Agent, or Firm*—Robert W. Becker; Robert W. Becker & Assoc.

(57) ABSTRACT

A double plug head for plugging a pipe. The double plug head includes a primary rubber packing, a roller support, a tube support and a rubber tube. The primary rubber packing is provided on a mounting plate of a plugging machine. The roller support is provided with a plurality of rollers. The tube support is provided between the primary rubber packing and the roller support. A tube seating depression is formed around the circumferential surface of the tube support. A fluid feed path is formed in the tube support. The rubber tube is seated into the tube seating depression and has a nipple connected to an outlet of the fluid feed path. Communication holes which communicate with the fluid feed path are respectively formed in the primary rubber packing and the mounting plate. A fluid hose is connected to the communication hole of the mounting plate.

3 Claims, 12 Drawing Sheets

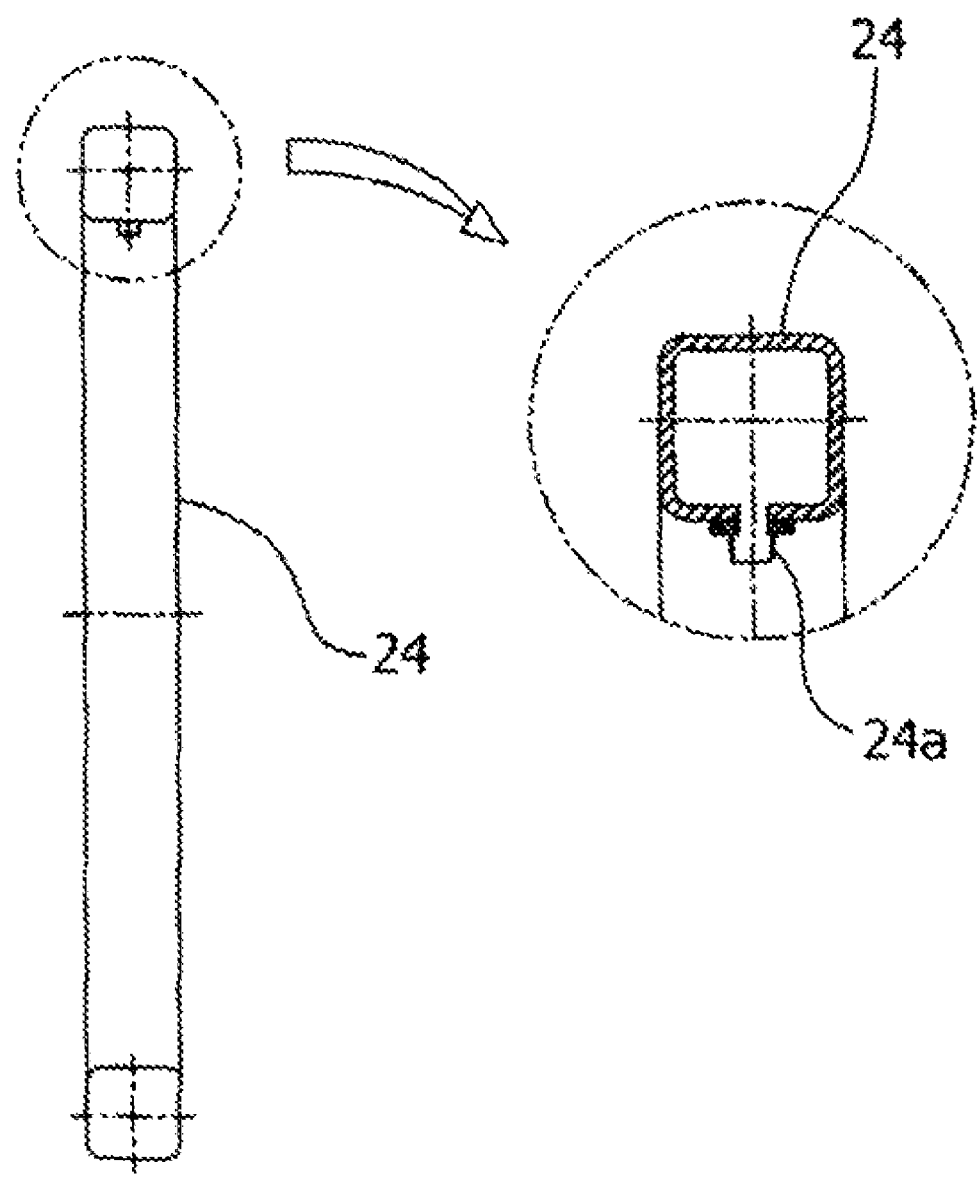

DOUBLE PLUG HEAD FOR PLUGGING PIPE

The instant application should be granted the priority dates of Mar. 12, 2010, the filing date of the corresponding Korean patent application 10-2010-0022530.

BACKGROUND OF THE INVENTION

1. Field of the Invention

The present invention relates generally to plug heads which plug desired portions of pipes through which fluid such as gas, oil, water, etc., flows at high pressure and, more particularly, to a double plug head which is used when plugging a desired portion of a pipe to conduct maintenance of the pipe, for example replacement of a valve, installation or movement of the pipe, replacement of an old pipe with a new one, etc., and which is configured such that the pipe is primarily plugged by a rubber packing provided around the plug head and is secondarily plugged by a rubber tube which can be expanded by compressed fluid injected thereinto, so that a gap between the inner surface of the pipe and the rubber tube can be completely plugged, thus reliably preventing gas or the like from leaking through the plug head.

2. Description of Related Art

Generally, city gas is used as fuel in most households, factories, stores and so on, so that a great number of gas pipes are laid under the ground in a city or village in the shape of a cobweb. In addition, various kinds of fluid supply pipes, such as pipes for transporting oil, hot-water supply pipes, service water pipes, etc., are laid under the ground. In the following explanation, a gas pipe will be used as a representative example of such a pipe.

In such a pipe, when maintenance of a pipe, for example replacement of a valve, installation or movement of the pipe, replacement of an old pipe with a new one, etc., is conducted, it is required to plug a desired portion of the pipe such that gas cannot flow through the pipe or that it is bypassed. In this case, the flow of gas through the main pipe is blocked in such a way as to insert a plug head into the main pipe to be plugged using a plugging machine.

FIG. 1 illustrates a conventional plug head which is in a state of being inserted into a main pipe 1 using a plugging machine. To plug the main pipe 1, a branch fitting 4 and a control valve 3 are provided on the main pipe 1. Thereafter, a branch pipe 2 is connected to the branch fitting 4. Subsequently, a plugging machine 10 is coupled to the branch pipe 2.

A guide 12 and a lever unit 13 are connected to a piston rod 11 of the plugging machine 10. The lever unit 13 is provided with a mounting plate 14. A rubber packing 21' and a roller support 22 are coupled to the mounting plate 14. Rollers 22a, 22b and 22c are provided on the roller support 22.

When the piston rod 11 of the plugging machine 10 is extended downwards, the frontmost roller 22a comes into contact with the bottom of the inner surface of the main pipe 1 and then the lever unit 13 rotates. Thereafter, the second roller 22b comes into contact with the bottom of the main pipe 1. Finally, the lever unit 13 rotates 90° and the third roller 22c comes into contact with the bottom of the inner surface of the main pipe 1.

As such, when the lever unit 13 rotates 90°, the rubber packing 21' seals the main pipe 1, thus blocking the flow of gas. In this state in which the flow of gas is stopped, maintenance of the pipe is conducted at a downstream side of the main pipe 1 with respect to the plug head.

However, typically, the inner surface of the main pipe 1 is uneven because it rusts due to having been used for a long period of time or because of impurities which are applied thereto. Hereby, a fine gap may be formed between the rubber packing 21' and the inner surface of the main pipe 1, resulting in gas leaking. Particularly, such a leakage of gas makes maintenance work on the pipe dangerous.

SUMMARY OF THE INVENTION

Accordingly, the present invention has been made keeping in mind the above problems occurring in the prior art, and an object of the present invention is to provide a double plug head which can completely plug a pipe without forming a fine gap, thus reliably preventing gas from leaking so that maintenance work on the pipe can be conducted under safe conditions.

In order to accomplish the above object, the present invention provides a double plug head to be inserted into a main pipe by a plugging machine so as to plug the main pipe, the double plug head including: a primary rubber packing provided on a mounting plate of the plugging machine, the primary rubber packing having an annular rim coming into close contact with an inner surface of the main pipe; a roller support provided with a plurality of rollers; a tube support provided between the primary rubber packing and the roller support, with a tube seating depression formed around a circumferential surface of the tube support, and a fluid feed path formed in the tube support, the fluid feed path communicating with the tube seating depression; and a rubber tube seated into the tube seating depression of the tube support, the rubber tube being provided with a nipple connected to an outlet of the fluid feed path, wherein first and second communication holes are respectively formed in the primary rubber packing and the mounting plate, the first and second communication holes communicating with the fluid feed path of the tube support, and a fluid hose is connected to the second communication hole of the mounting plate, the fluid hose extending to the outside of the main pipe.

Furthermore, a fluid discharge path may be formed in the tube support to discharge gas from a space defined between the primary rubber packing and the rubber tube. Third and fourth communication holes may be respectively formed in the primary rubber packing and the mounting plate. The third and fourth communication holes may communicate with the fluid discharge path. A fluid hose may be connected to the fourth communication hole of the mounting plate. The fluid hose may extend to the outside of the main pipe.

In addition, a plurality of bolt holes may be formed in each of the primary rubber packing and the tube support, so that the primary rubber packing and the tube support, along with the roller support, are mounted to the mounting plate by bolts.

BRIEF DESCRIPTION OF THE DRAWINGS

The above and other objects, features and advantages of the present invention will be more clearly understood from the following detailed description taken in conjunction with the accompanying drawings, in which:

FIG. 5B is a sectional view of the rubber tube taken along the line C-C of FIG. 5A;

DESCRIPTION OF PREFERRED EMBODIMENTS

Hereinafter, a preferred embodiment of the present invention will be described in detail with reference to the attached drawings.

Figure 1:
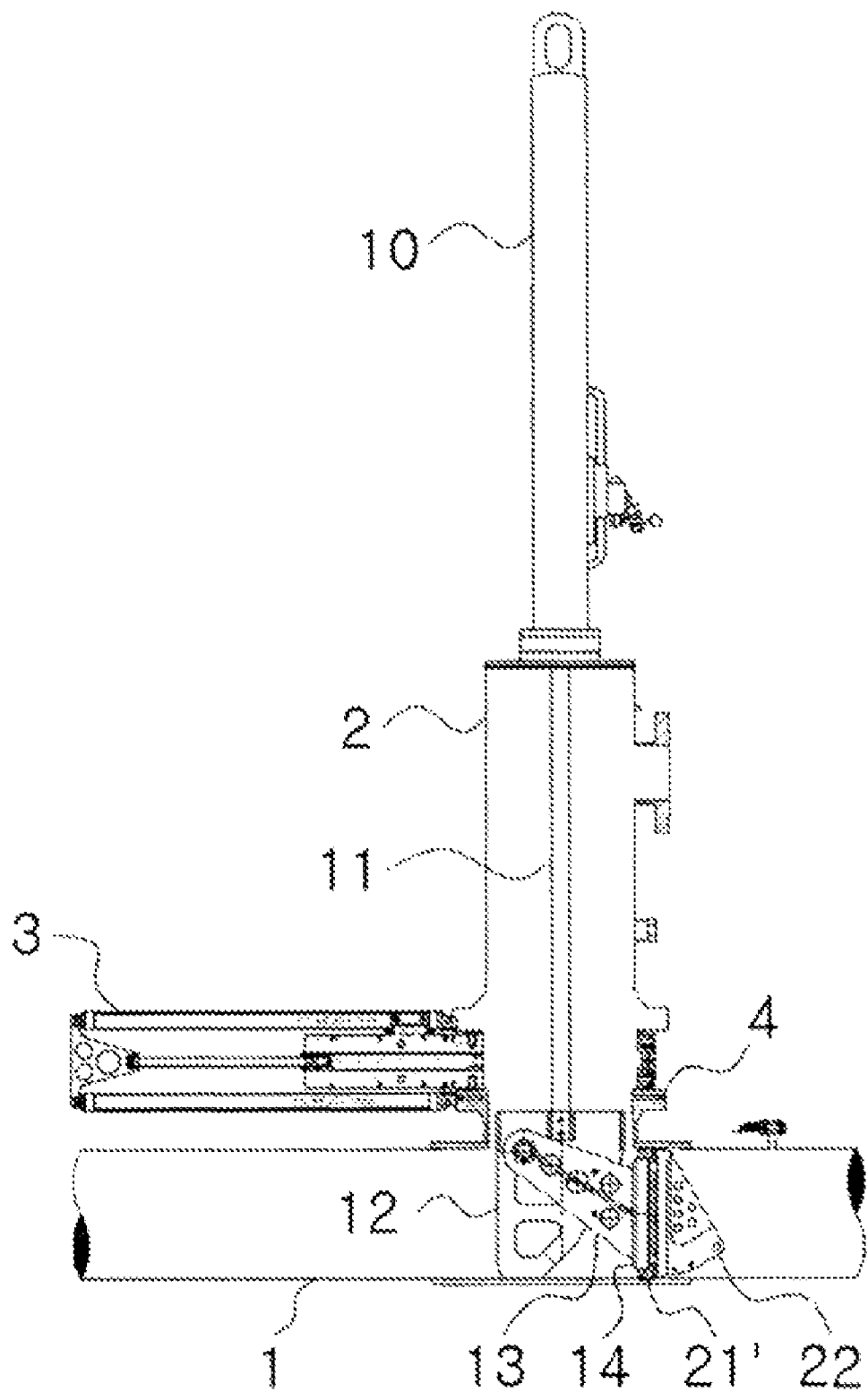
FIG. 1 is a view showing a plug head which is in a state of being inserted into a main pipe using a plugging machine, according to a conventional technique.

A double plug head 20 according to the present invention is inserted into a main pipe 1 to plug the main pipe 1 by a plugging machine. Referring to FIG. 1 showing the conventional technique, the plugging machine includes a piston rod 11, a guide 12 which is connected to a front end of the piston rod 11, and a lever unit 13 which is rotatably coupled to the guide 12.

Figure 2A:
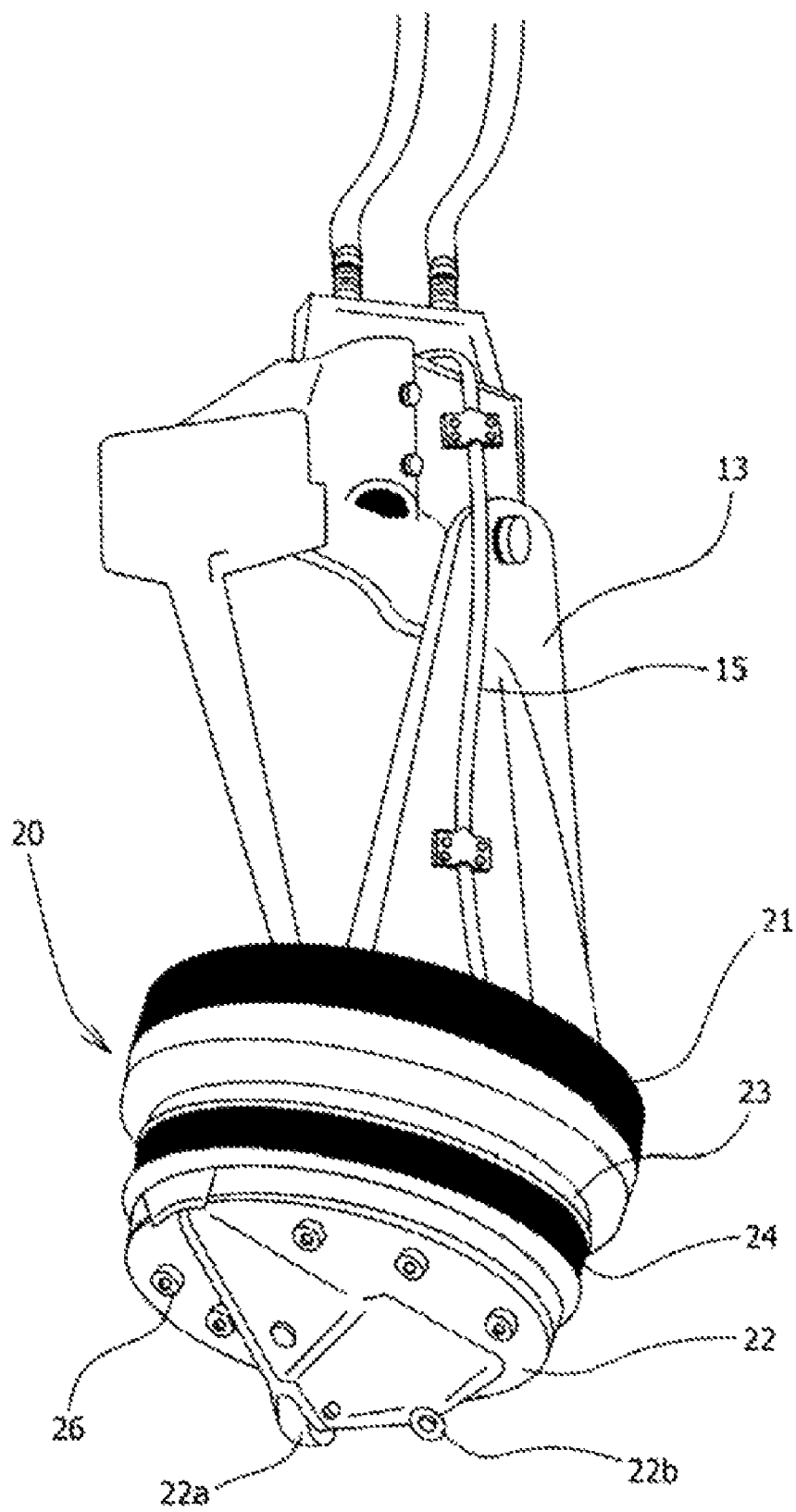
FIG. 2A is a perspective view of a double plug head for plugging a pipe, according to an embodiment of the present invention.
Figure 2B:
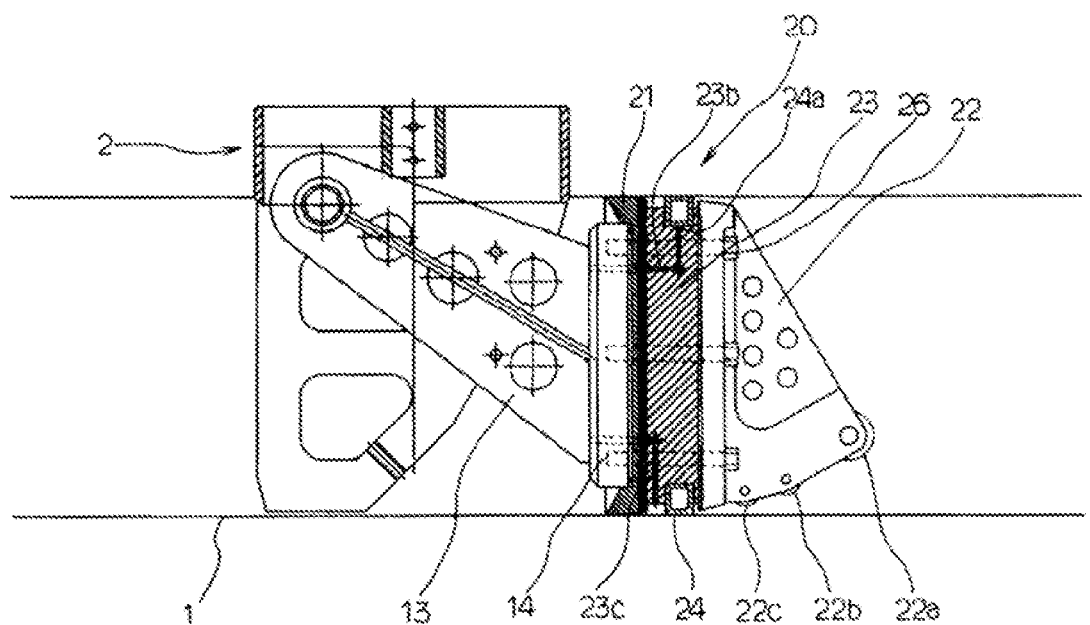
FIG. 2B is a partial sectional view of the double plug head according to the present invention.
Figure 3A:
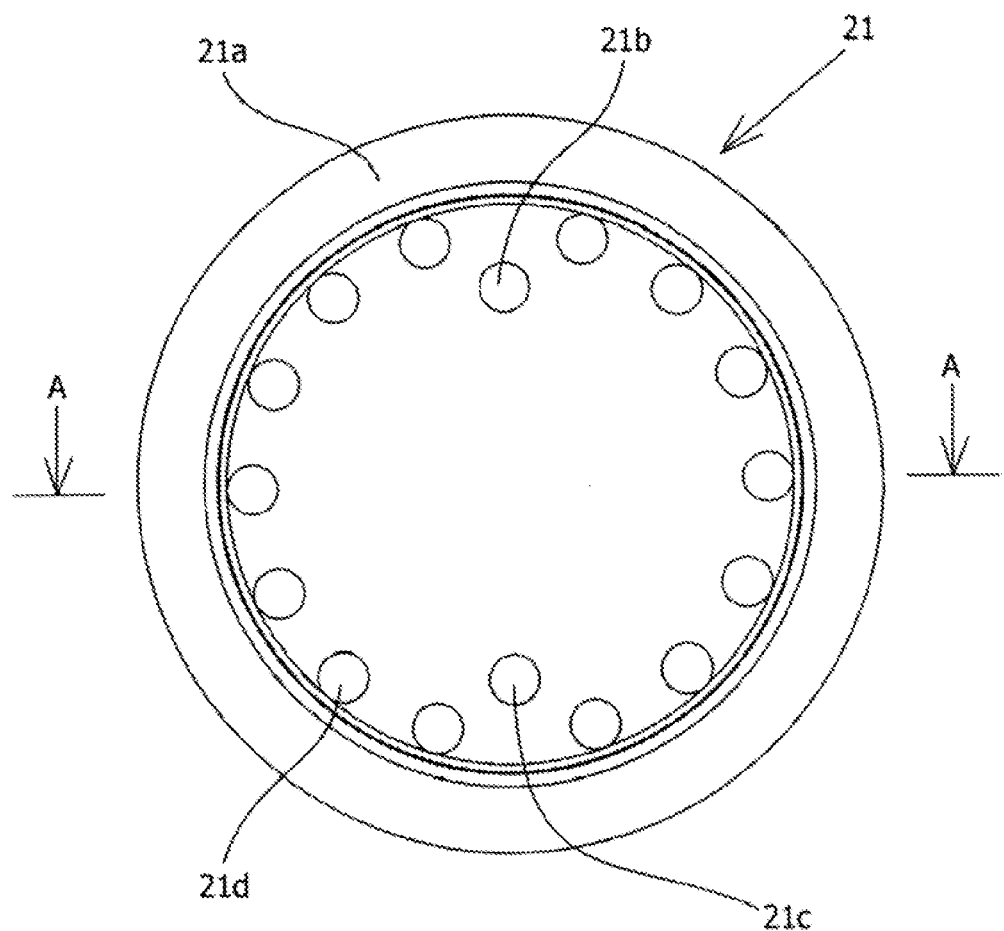
FIG. 3A is a plan view illustrating a primary rubber packing of the double plug head according to the present invention.
Figure 3B:
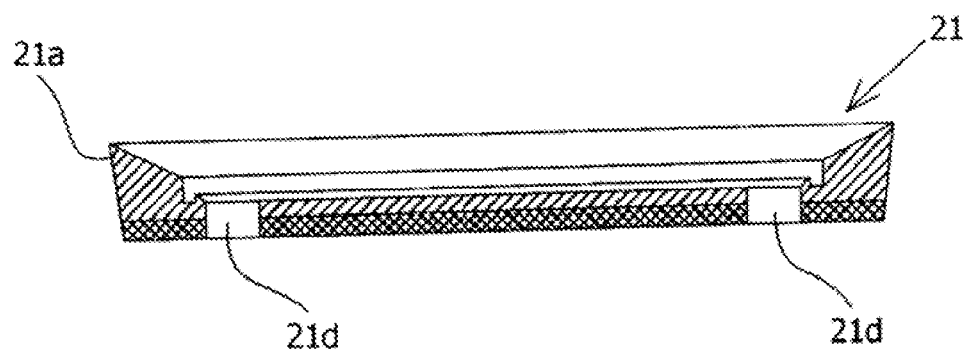
FIG. 3B is a sectional view of the primary rubber packing taken along the line A-A of FIG. 3A.
Figure 4A:
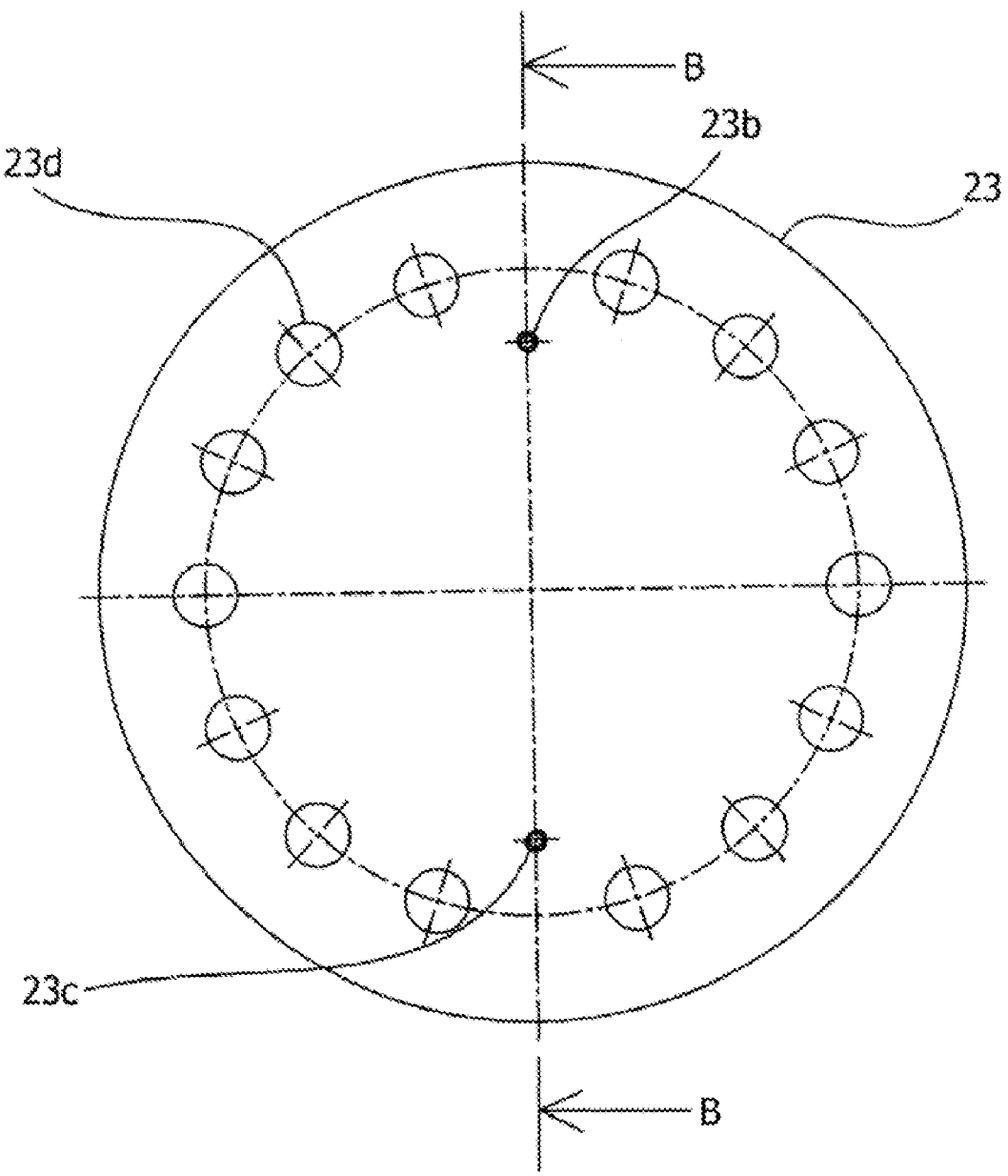
FIG. 4A is a plan view illustrating a tube support of the double plug head according to the present invention.
Figure 4B:
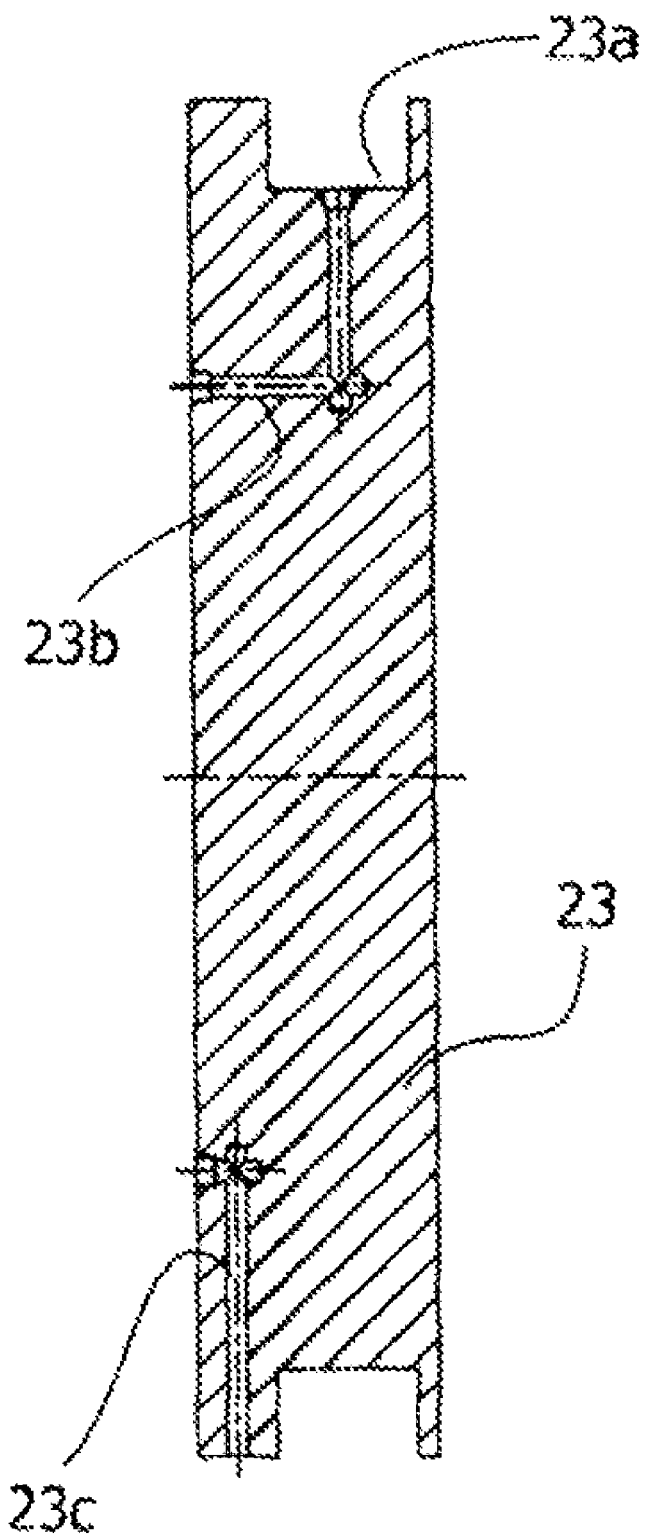
FIG. 4B is a sectional view of the tube support taken along the line B-B of FIG. 4A.
Figure 5A:
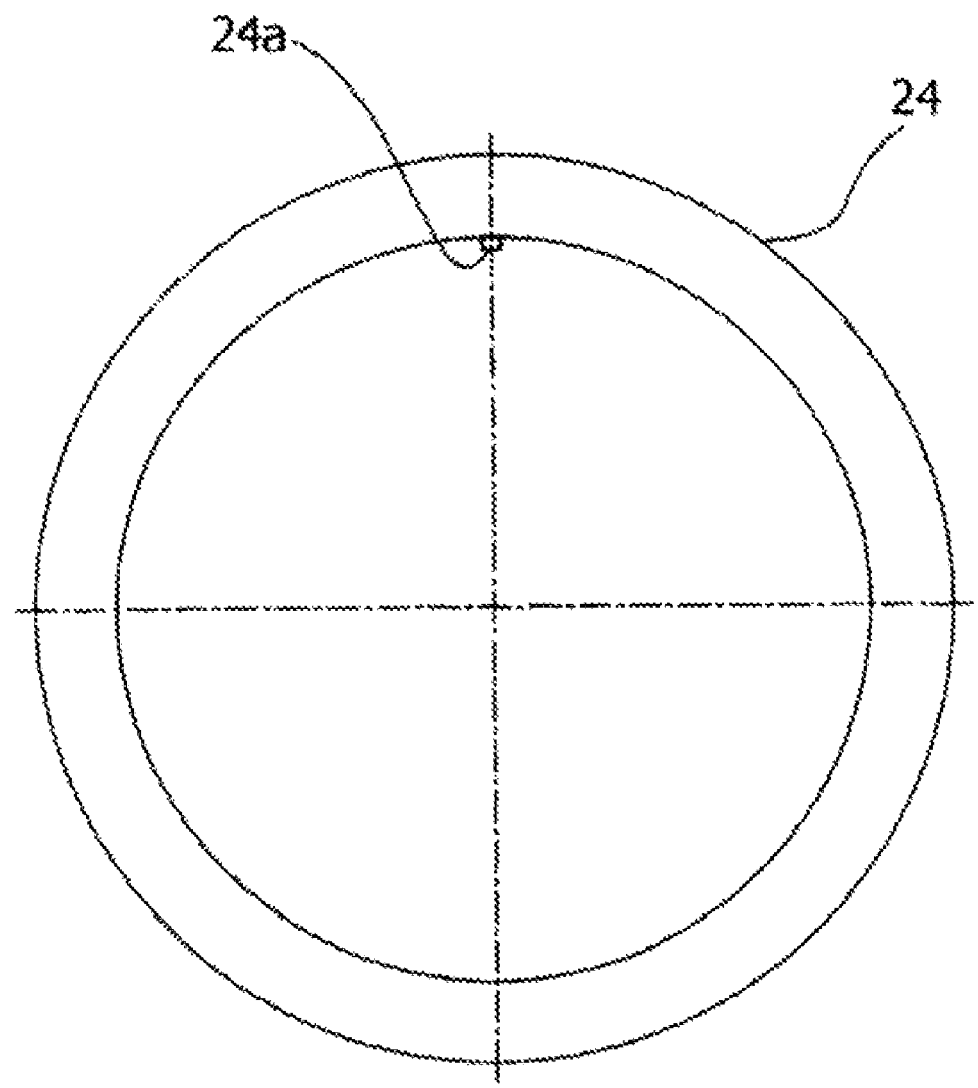
FIG. 5A is a plan view illustrating a rubber tube of the double plug head according to the present invention.
Figure 6A:
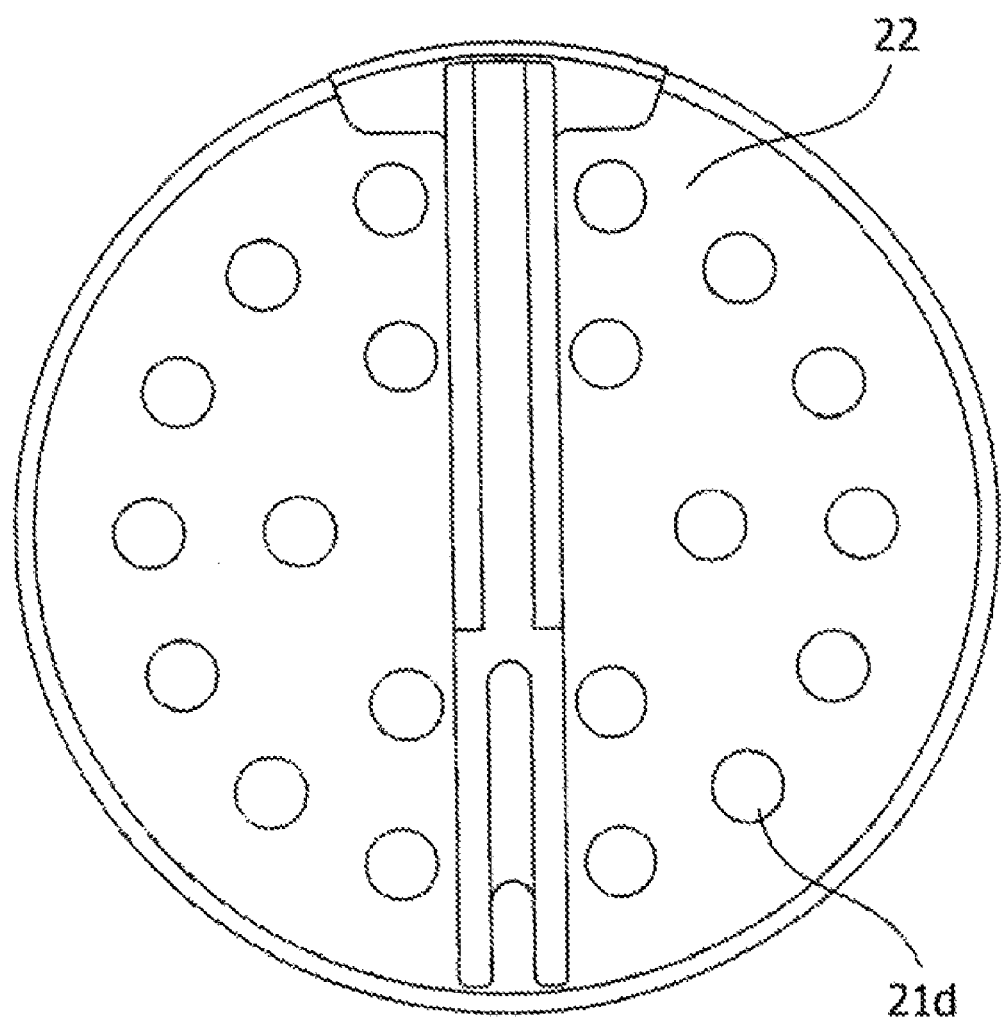
FIG. 6A is a plan view illustrating a roller support of the double plug head according to the present invention.
Figure 6B:
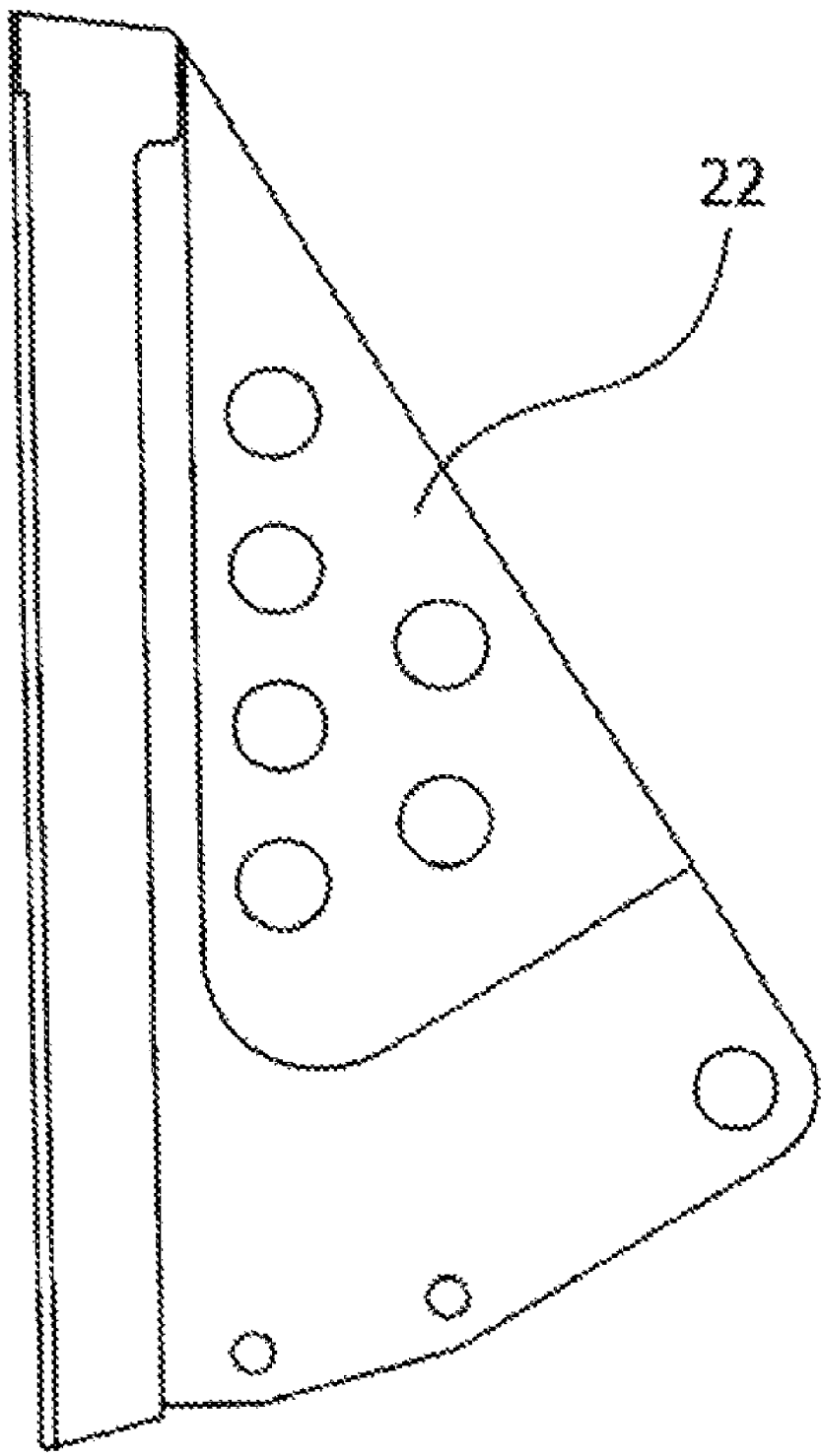
FIG. 6B is a side view of the roller support of FIG. 6A.
Figure 7A:
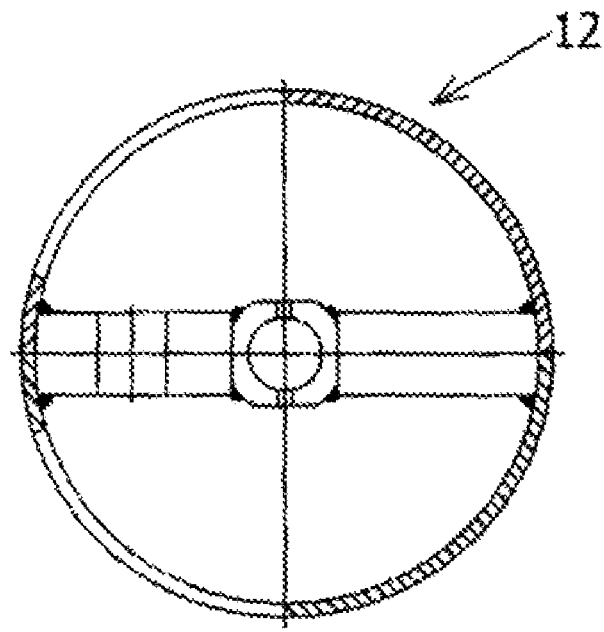
FIG. 7A is a plan sectional view illustrating a guide of the plugging machine used to install the plug head according to the present invention.
Figure 7B:
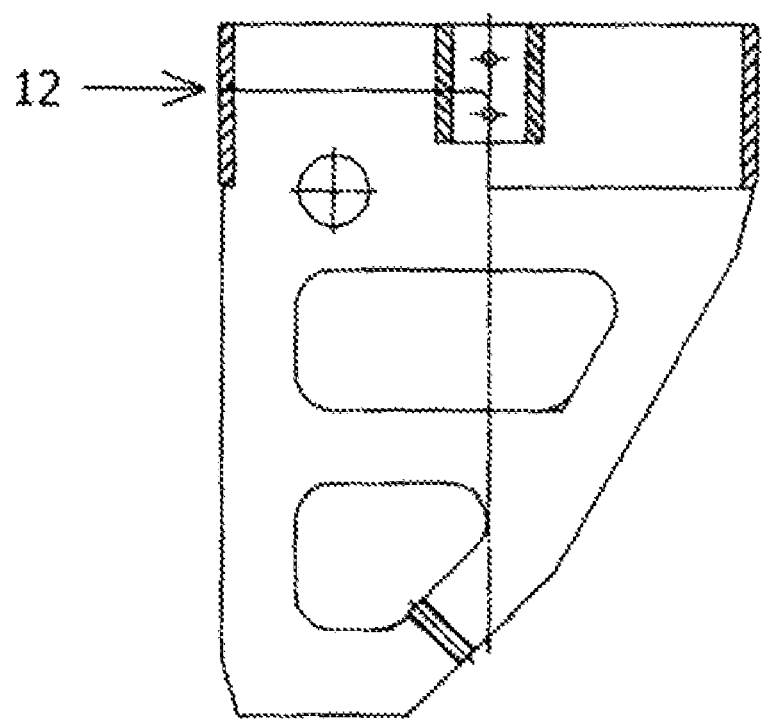
FIG. 7B is a side sectional view of the guide of FIG. 7A.
Figure 8:
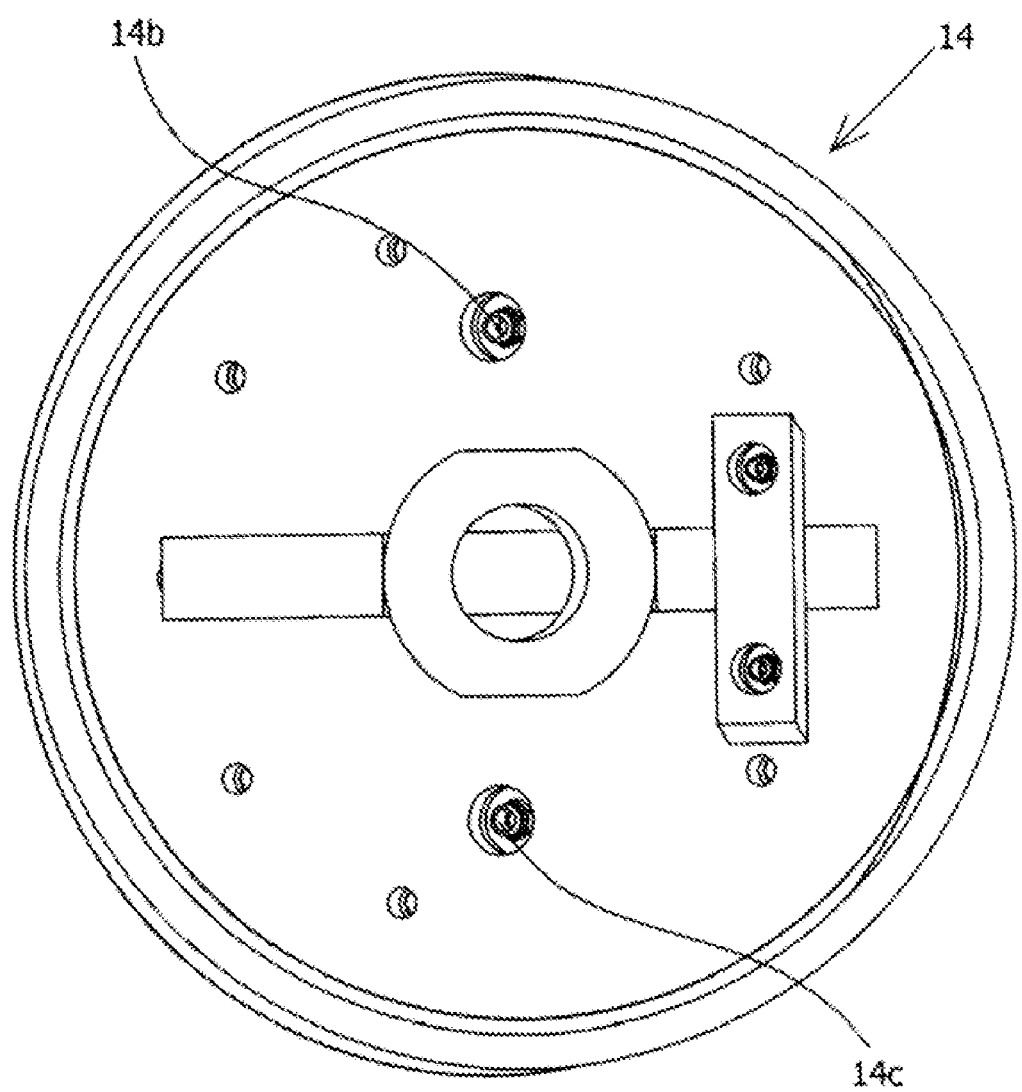
FIG. 8 is a plan sectional view illustrating a mounting plate of a lever unit of the plugging machine used to install the plug head according to the present invention.

As shown in FIGS. 2A and 2B, the double plug head 20 is coupled to the lever unit 13. The double plug head 20 includes a primary rubber packing 21 which has an annular rim 21a (FIG. 3a) which comes into close contact with the inner surface of the main pipe 1, and a roller support 22 on which rollers 22a, 22b and 22c are provided. The double plug head 20 further includes a tube support 23 which is provided between the primary rubber packing 21 and the roller support 22. A tube seating depression 23a (FIG. 4b) is formed around the circumference of the tube support 23. A fluid feed path 23b and a fluid discharge path 23c are formed in the tube support 23. The primary rubber packing 21, the roller support 22 and the tube support 23 are mounted to a mounting plate 14 of the lever unit 13 by long bolts 26. In FIG. 2B, only three bolts 26 are illustrated for the sake of convenience.

Furthermore, a rubber tube 24 is seated into the tube seating depression 23a of the tube support 23. The rubber tube 24 is provided with a nipple 24a which is connected to an outlet of the fluid feed path 23b. An external thread is formed on the outer surface of the nipple 24a, so that the nipple 24a is coupled to a threaded hole formed in the outlet of the fluid feed path 23b in a threaded coupling manner. In the embodiment, after the nipple 24a is threaded into the outlet of the fluid feed path 23b, the rubber tube 24 is fitted over the tube support 23 and seated into the tube seating depression 23a under its own elasticity.

Communication holes 21b and 14b which communicate with the fluid feed path 23b of the tube support 23 are respectively formed in the primary rubber packing 21 and the mounting plate 14 of the lever unit 13. In addition, communication holes 21c and 14c which communicate with the fluid discharge path 23c of the tube support 23 are respectively formed in the primary rubber packing 21 and the mounting plate 14. Fluid hoses 15 are respectively connected to the communication holes 14b and 14c of the mounting plate 14.

The operation of the double plug head having the above-mentioned construction will be explained. In the same manner as the conventional technique, the plug head 20 of the present invention is connected to the lever unit 13 of the plugging machine 10. When the piston rod 11 of the plugging machine 10 is extended, the frontmost roller 22a comes into contact with the bottom of the inner surface of the main pipe 1 and then the lever unit 13 rotates. Thereafter, the second roller 22b comes into contact with the bottom of the inner surface of the main pipe 1. Finally, the lever unit 13 rotates 90° and the third roller 22c comes into contact with the bottom of the inner surface of the main pipe 1.

As such, when the lever unit 13 rotates 90°, the primary rubber packing 21 seals the main pipe 1. Subsequently, gas is injected into the rubber tube 24 via the communication holes 14b and 21b, the fluid feed path 23b and the nipple 24a.

Then, as shown in FIG. 2B, the rubber tube 24 is expanded and thus is brought into close contact with the inner surface of the main pipe 1. Therefore, in the double plug head 20 of the present invention, the flow of gas is primarily blocked by the primary rubber packing 21 and secondarily blocked by the rubber tube 24. Particularly, because the rubber tube 24 is flexible, even if the inner surface of the main pipe 1 is uneven, the rubber tube 24 can come into tight contact with the inner surface of the main pipe 1. Thereby, the flow of gas can be reliably blocked.

Furthermore, because the fluid discharge path 23c is formed in the tube support 23 between the primary rubber packing 21 and the rubber tube 24, a very small amount of gas which passes through the primary rubber packing 21 is discharged to the air or into a separate storage tank (not shown) through the fluid discharge path 23c, the communication holes 21c and 14c, and the corresponding fluid hose. Here, pressure between the primary rubber packing 21 and the rubber tube 24 is relatively low, so that the effect of the main pipe 1 being plugged by the rubber tube 24 can be further enhanced.

As described above, in a double plug head for plugging a pipe according to the present invention, when it plugs a main pipe at a desired position so that maintenance can be conducted on the pipe, a primary rubber packing primarily plugs the pipe and a flexible rubber tube secondarily plugs the pipe. Therefore, the main pipe can be perfectly plugged. Furthermore, the present invention is configured such that a fine gap is more reliably prevented from being formed between the inner surface of the main pipe and the plug head. Even if a very small amount of gas passes through the primary rubber packing, it is discharged to the outside of the main pipe through a fluid discharge path which is formed between the primary rubber packing and the rubber tube. Thus, gas can be reliably prevented from leaking through the plug head.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

We claim:

1. A double plug head to be inserted into a main pipe by a plugging machine so as to plug the main pipe, the double plug head comprising:

a primary rubber packing provided on a mounting plate of the plugging machine, wherein said primary rubber packing has an annular rim configured to come into close contact with an inner surface of the main pipe;

a roller support provided with a plurality of rollers;

a tube support provided between said primary rubber packing and said roller support, wherein a tube seating depression is formed around a circumferential surface of said tube support, further wherein a fluid feed path is formed in said tube support, and wherein said fluid feed path communicates with said tube seating depression; and a rubber tube seated in said tube seating depression of said tube support, wherein said rubber tube is provided with a nipple connected to an outlet of said fluid feed path, further wherein first and second communication holes are respectively formed in said primary rubber packing and the mounting plate, further wherein said first and second communication holes communicate with said fluid feed path of said tube support, further wherein a fluid hose is connected to the second communication hole of the mounting plate, and wherein the fluid hose extends to the outside of the main pipe.

2. The double plug head as set forth in claim 1, wherein a fluid discharge path is formed in said tube support to discharge gas from a space defined between said primary rubber packing and said rubber tube, further wherein third and fourth communication holes are respectively formed in said primary rubber packing and the mounting plate, further wherein said third and fourth communication holes communicate with said fluid discharge path, further wherein a fluid hose is connected to the fourth communication hole of the mounting plate, and wherein the fluid hose extends to the outside of the main pipe.

3. The double plug head as set forth in claim 1, wherein a plurality of bolt holes is formed in each of said primary rubber packing and said tube support, and wherein said primary rubber packing, said tube support, and said roller support are mounted to the mounting plate by bolts placed through said bolt holes.

* * * * *